United States Patent
Liao (10) Patent No.: US 8,954,717 B2
(45) Date of Patent: Feb. 10, 2015

(54) SYSTEM CAPABLE OF BOOTING THROUGH A UNIVERSAL SERIAL BUS DEVICE AND METHOD THEREOF

(75) Inventor: Yi-Ting Liao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 580 days.

(21) Appl. No.: 13/316,567

(22) Filed: Dec. 12, 2011

(65) Prior Publication Data
US 2013/0061030 A1 Mar. 7, 2013

(30) Foreign Application Priority Data
Sep. 7, 2011 (TW) .............................. 100132213 A (51) Int. Cl.
*G06F 15/177* (2006.01)
*G06F 1/24* (2006.01)
*G06F 9/44* (2006.01)

(52) U.S. Cl.
CPC ................ *G06F 15/177* (2013.01); *G06F 1/24* (2013.01); *G06F 9/44* (2013.01); *G06F 9/4401* (2013.01)
USPC .................................... 713/1; 713/2; 713/100

(58) Field of Classification Search
USPC ................................................ 713/1, 2, 100
See application file for complete search history.

(56) References Cited

U.S. PATENT DOCUMENTS

| 7,895,384 B2 * | 2/2011 | Matsui .......................... 710/300 |
| 8,250,274 B2 * | 8/2012 | Matsui .......................... 710/300 |
| 2003/0126483 A1 * | 7/2003 | Huang et al. .................. 713/310 |

FOREIGN PATENT DOCUMENTS

| TW | 200632660 | 9/2006 |
| TW | 200825901 | 6/2008 |

OTHER PUBLICATIONS

Office action mailed on Apr. 29, 2014 for the Taiwan application No. 100132213, filing date: Sep. 7, 2011, p. 2 line 17-26 and p. 3 line 1-6.
Office action mailed on Mar. 4, 2014 for the Taiwan application No. 100132213, filing date: Sep. 7, 2011, p. 1 line 13-14, p. 2-5 and p. 6 line 1-11 Translation.

\* cited by examiner

*Primary Examiner* — M Elamin
(74) *Attorney, Agent, or Firm* — Winston Hsu; Scott Margo (57) ABSTRACT

A system capable of booting through a Universal Serial Bus device includes a Universal Serial Bus port, an embedded controller, a platform control hub, and a basic input/output system. The embedded controller is used for generating a boot signal when the system is powered off and at least one Universal Serial Bus device is plugged into the Universal Serial Bus port. The platform control hub is woken up according to the boot signal. The basic input/output system has boot sequence setting values. The basic input/output system first starts to boot the at least one Universal Serial Bus device through the platform control hub according to the boot sequence setting values when the basic input/output system is woken up according to the boot signal.

30 Claims, 7 Drawing Sheets

SYSTEM CAPABLE OF BOOTING THROUGH A UNIVERSAL SERIAL BUS DEVICE AND METHOD THEREOF

BACKGROUND OF THE INVENTION

1. Field of the Invention

The present invention is related to a system and method thereof, and particularly to a system capable of booting through a Universal Serial Bus device and method thereof.

2. Description of the Prior Art

In the prior art, when a user wants to power on a host, the user needs to press a power button of the host. Then, a basic input/output system of the host can turn on devices within the host and peripheral devices coupled to the host in turn according to a signal generated by the power button and boot sequence setting values stored in the basic input/output system, where the host usually starts booting a hard disc of the host first.

However, when the user wants to use the host and the host is powered off, the user may waste much time locating the power button of the host. Then, the user presses the power button of the host, and the host can first start booting the hard disc of the host according to the boot sequence setting values. In addition, as cloud technology advances, the host may not have the hard disc, so the host booting the hard disc first may not be compatible with a future trend toward the cloud technology.

To sum up, the host booting the hard disc first is not only inconvenient for the user, but may also fail to be compatible with the future trend toward the cloud technology.

SUMMARY OF THE INVENTION

An embodiment provides a system capable of booting through a Universal Serial Bus device. The system includes a Universal Serial Bus port, an embedded controller, a platform control hub, and a basic input/output system. The embedded controller is coupled to the Universal Serial Bus port for generating a boot signal when the system is powered off and at least one Universal Serial Bus device is plugged into the Universal Serial Bus port. The platform control hub is used for being woken up according to the boot signal. The basic input/output system is coupled to the platform control hub and the embedded controller. The basic input/output system has boot sequence setting values, and the basic input/output system first starts to boot the at least one Universal Serial Bus device through the platform control hub according to the boot sequence setting values when the basic input/output system is woken up according to the boot signal.

Another embodiment provides a method capable of booting through a Universal Serial Bus device. The method includes an embedded controller generating a boot signal when the system is powered off and at least one Universal Serial Bus device is plugged into a Universal Serial Bus port; waking up a platform control hub and a basic input/output system according to the boot signal; the basic input/output system first starting to boot the at least one Universal Serial Bus device through the platform control hub according to boot sequence setting values.

The present invention provides a system capable of booting through a Universal Serial Bus device and method thereof. The system and the method utilize an embedded controller to generate a boot signal when the system is powered off and at least one Universal Serial Bus device is plugged into a Universal Serial Bus port. Then, a basic input/output system can start to boot the at least one Universal Serial Bus device first through a platform control hub according to changed boot sequence setting values. Thus, a user can plug a Universal Serial Bus device into the system to power on the system very conveniently, instead of wasting much time to locate a power button of the system. In addition, the system may not have a hard disc as cloud technology advances, so the present invention can also be compatible with a future trend toward the cloud technology.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
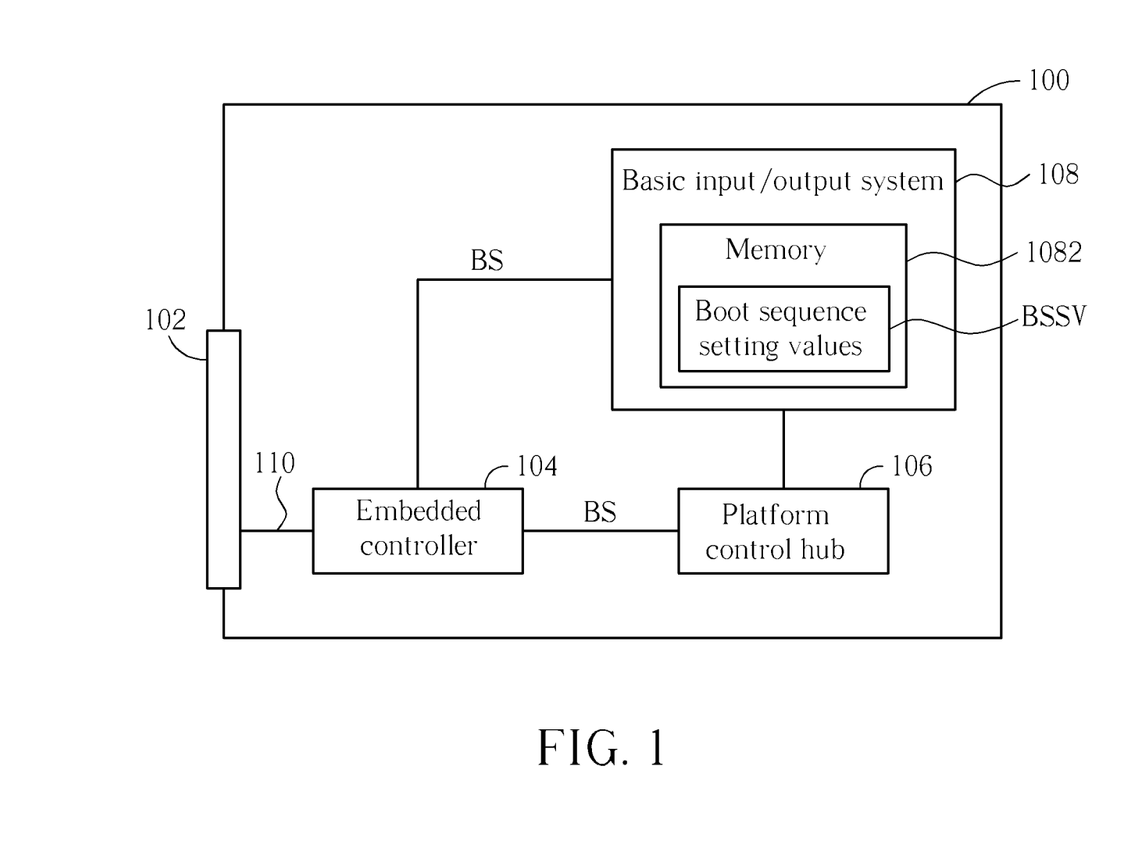
FIG. 1 is a diagram illustrating a system capable of booting through a Universal Serial Bus device according an embodiment.

Please refer to FIG. 1. FIG. 1 is a diagram illustrating a system 100 capable of booting through a Universal Serial Bus device according an embodiment. The system 100 includes a Universal Serial Bus port 102, an embedded controller 104, a platform control hub 106, and a basic input/output system 108. The embedded controller 104 is coupled to the Universal Serial Bus port 102 through a General Purpose I/O pin 110 for generating a boot signal BS when the system 100 is powered off, an external device booting function of the embedded controller 104 is enabled and at least one Universal Serial Bus device is plugged into the Universal Serial Bus port 102. The platform control hub 106 is used for being woken up according to the boot signal BS, where the General Purpose I/O pin 110 can be coupled to any pin of 8 pins of the Universal Serial Bus port 102. The basic input/output system 108 is coupled to the platform control hub 106 and the embedded controller 104. A memory 1082 of the basic input/output system 108 has boot sequence setting values BSSV, and the boot sequence setting values BSSV store a code of at least one device coupled to the system 100. The basic input/output system 108 can change the boot sequence setting values BSSV according to the external device booting function of the embedded controller 104, or the basic input/output system 108 can change the boot sequence setting values BSSV according to the boot signal BS. When the basic input/output system 108 is woken up according to the boot signal BS, the basic input/output system 108 can first start to boot the at least one Universal Serial Bus device through the platform control hub 106 according to changed boot sequence setting values. Then, the basic input/output system 108 turns on devices within the system 100 and peripheral devices coupled to the system 100 in turn according to the changed boot sequence setting values.

Please refer to FIG. 2 to FIG. 5. FIG. 2 to FIG. 5 are diagrams illustrating logic voltage variation of the General Purpose I/O pin 110. When the system 100 is powered off, the system 100 still has S5 power according to a specification of an advanced configuration and power interface (ACPI).

Figure 2:
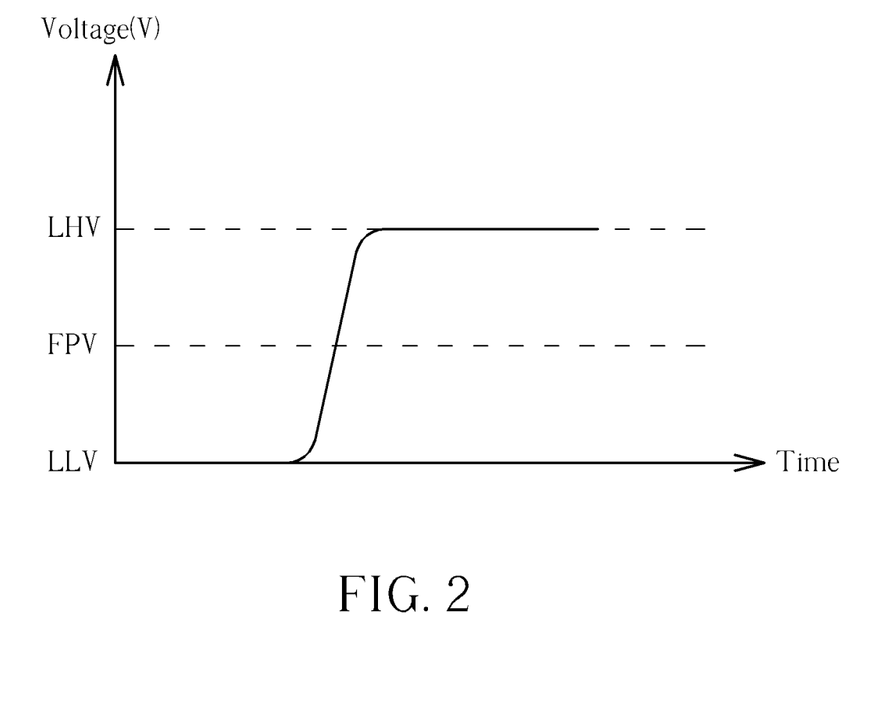
FIG. 2 to FIG. 5 are diagrams illustrating logic voltage variation of the General Purpose I/O pin.
Figure 3:
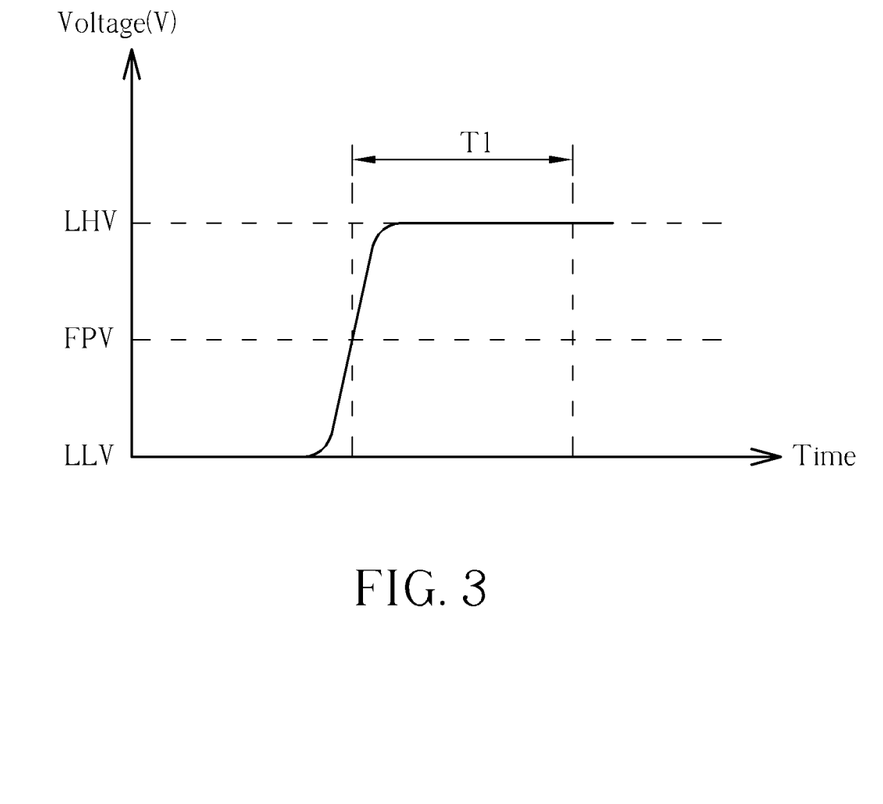
Figure 4:
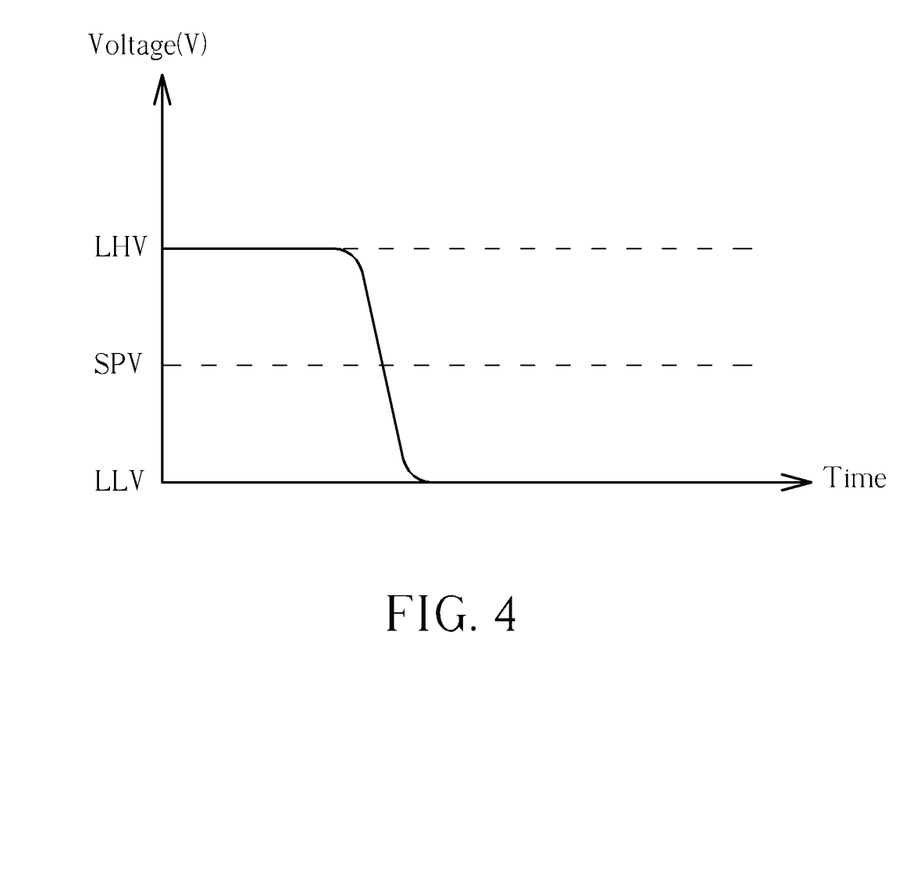
Figure 5:
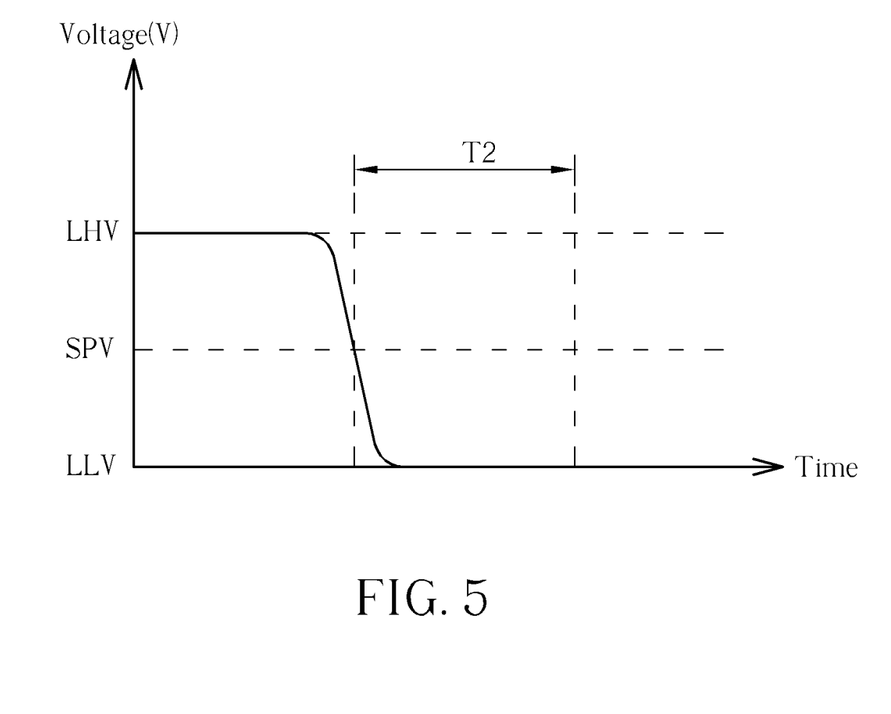

Therefore, when a Universal Serial Bus device is plugged into the Universal Serial Bus port 102, the General Purpose I/O pin 110 can generate logic voltage variation according to the S5 power. As shown in FIG. 2, the logic voltage variation of the General Purpose I/O pin 110 is variation from a logic-low voltage LLV to a logic-high voltage LHV, and the logic-high voltage LHV is higher than a first predetermined value FPV. As shown in FIG. 3, the logic voltage variation of the General Purpose I/O pin 110 is variation from the logic-low voltage LLV to the logic-high voltage LHV, and the logic-high voltage LHV is higher than the first predetermined value FPV for a first predetermined period T1. As shown in FIG. 4, the logic voltage variation of the General Purpose I/O pin 110 is variation from the logic-high voltage LHV to the logic-low voltage LLV, and the logic-low voltage LLV is lower than a second predetermined value SPV. As shown in FIG. 5, the logic voltage variation of the General Purpose I/O pin 110 is variation from the logic-high voltage LHV to the logic-low voltage LLV, and the logic-low voltage LLV is lower than the second predetermined value SPV for a second predetermined period T2. Therefore, the embedded controller 104 can generate the boot signal BS according to the logic voltage variation of the General Purpose I/O pin 110.

In addition, when a plurality of Universal Serial Bus devices are plugged into the Universal Serial Bus port 102 simultaneously, the basic input/output system 108 starts to boot one Universal Serial Bus device of the plurality of Universal Serial Bus devices first through the platform control hub 106 according to changed boot sequence setting values and port sequence of the Universal Serial Bus port 102.

Figure 6:
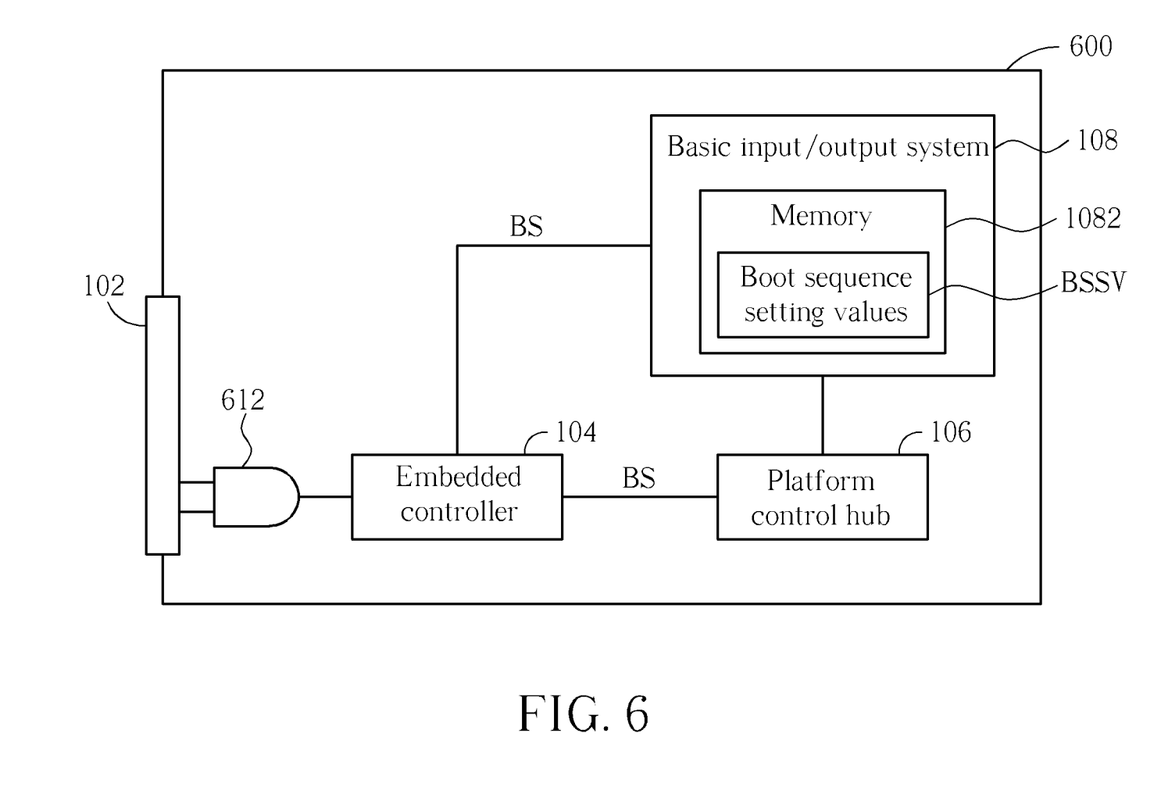
FIG. 6 is a diagram illustrating a system capable of booting through a Universal Serial Bus device according to another embodiment.

Please refer to FIG. 6. FIG. 6 is a diagram illustrating a system 600 capable of booting through a Universal Serial Bus device according to another embodiment. A difference between the system 600 and the system 100 is that the embedded controller 104 is coupled to the Universal Serial Bus port 102 through a logic circuit 612. As shown in FIG. 6, the logic circuit 612 is an AND gate. The logic circuit 612 has a first input terminal coupled to a pin of the Universal Serial Bus port 102, a second input terminal coupled to another pin of the Universal Serial Bus port 102, and an output terminal coupled to the embedded controller 104. When a Universal Serial Bus device is plugged into the Universal Serial Bus port 102, the first input terminal and the second input terminal of the logic circuit 612 can generate first logic voltage variations according to the S5 power, and the output terminal of the logic circuit 612 can output a second logic voltage variation according to an AND logic operation and the first logic voltage variations. Therefore, the embedded controller 104 can generate a boot signal BS according to the second logic voltage variation of the output terminal of the logic circuit 612. Further, subsequent operational principles of the system 600 are the same as those of the system 100, so further description thereof is omitted for simplicity. In addition, the present invention is not limited to the logic circuit 612 being an AND gate, that is, the logic circuit 612 can be another logic circuit. Therefore, any generating of a boot signal BS by the embedded controller 104 according to logic voltage variation of an output of a logic circuit falls within the scope of the present invention.

Figure 7:
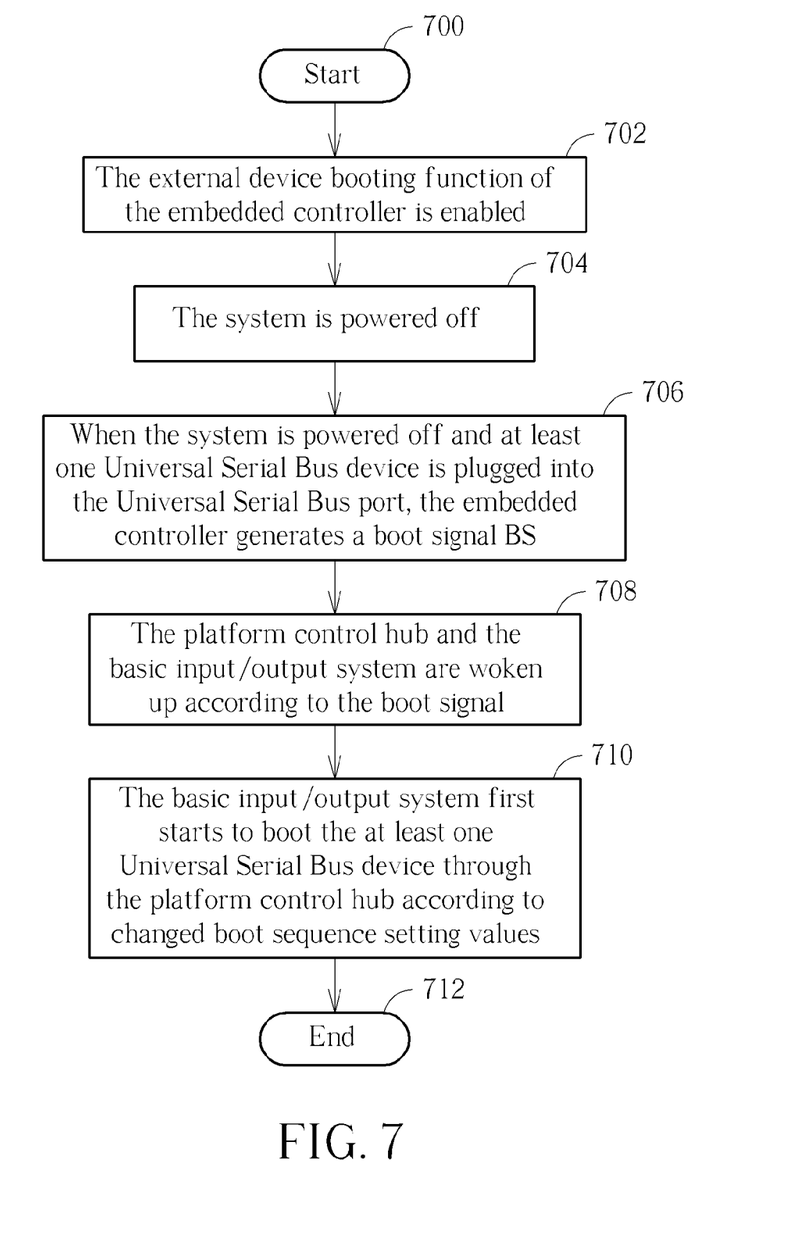
FIG. 7 is a flowchart illustrating a method capable of booting through a Universal Serial Bus device according to another embodiment.

Please refer to FIG. 7. FIG. 7 is a flowchart illustrating a method capable of booting through a Universal Serial Bus device according to another embodiment. The method in FIG. 7 is illustrated using the system 100 in FIG. 1 and the system 600 in FIG. 6. Detailed steps are as follows:

Step 700: Start.
Step 702: The external device booting function of the embedded controller 104 is enabled.
Step 704: The system 100 is powered off.
Step 706: When the system 100 is powered off and at least one Universal Serial Bus device is plugged into the Universal Serial Bus port 102, the embedded controller 104 generates a boot signal BS.
Step 708: The platform control hub 106 and the basic input/output system 108 are woken up according to the boot signal BS.
Step 710: The basic input/output system 108 first starts to boot the at least one Universal Serial Bus device through the platform control hub 106 according to changed boot sequence setting values.
Step 712: End.

In Step 702, a user can enable the external device booting function of the embedded controller 104 of the system 100. Because the external device booting function of the embedded controller 104 can be effective after the system 100 is re-powered on, the user needs to power off the system 100 in Step 704. In Step 706, the embedded controller 104 generates the boot signal BS according to logic voltage variation of the General Purpose I/O pin 110 (as shown in FIG. 1), where the General Purpose I/O pin 110 is coupled to any pin of the 8 pins of the Universal Serial Bus port 102. When at least one Universal Serial Bus device is plugged into the Universal Serial Bus port 102, the General Purpose I/O pin 110 can generate the logic voltage variation according to the S5 power. Therefore, the embedded controller 104 can generate the boot signal BS according to the logic voltage variation of the General Purpose I/O pin 110. In addition, the logic voltage variations of the General Purpose I/O pin 110 are shown in FIG. 2 to FIG. 5, so further description thereof is omitted for simplicity. In another embodiment of the present invention, the embedded controller 104 generates a boot signal BS according to logic voltage variation of the output terminal of the logic circuit 612 (as shown in FIG. 6). In Step 710, the memory 1082 of the basic input/output system 108 has boot sequence setting values BSSV, and the boot sequence setting values BSSV store a code of at least one device coupled to the system 100. The basic input/output system 108 can change the boot sequence setting values BSSV according to the external device booting function of the embedded controller 104, or the basic input/output system 108 can change the boot sequence setting values BSSV according to the boot signal BS. Therefore, when the basic input/output system 108 is woken up according to the boot signal BS, the basic input/output system 108 can start to boot the at least one Universal Serial Bus device first through the platform control hub 106 according to the changed boot sequence setting values. Then, the basic input/output system 108 turns on devices within the system 100 and peripheral devices coupled to the system 100 in turn according to the changed boot sequence setting values.

To sum up, the system capable of booting through a Universal Serial Bus device and method thereof utilize the embedded controller to generate a boot signal when the system is powered off and at least one Universal Serial Bus device is plugged into the Universal Serial Bus port. Then, the basic input/output system can start to boot the at least one Universal Serial Bus device first through the platform control hub according to changed boot sequence setting values. Thus, the user can plug a Universal Serial Bus device into the system to power on the system very conveniently, instead of wasting much time to locate a power button of the system. In addition, the system may not have a hard disc as cloud technology advances, so the present invention can also be compatible with a future trend toward the cloud technology.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A system capable of booting through a Universal Serial Bus device, the system comprising:
   a Universal Serial Bus port;
   an embedded controller coupled to the Universal Serial Bus port for generating a boot signal when the system is powered off and at least one Universal Serial Bus device is plugged into the Universal Serial Bus port;
   a platform control hub for being woken up according to the boot signal; and
   a basic input/output system coupled to the platform control hub and the embedded controller, wherein the basic input/output system has boot sequence setting values, and the basic input/output system first starts to boot the at least one Universal Serial Bus device through the platform control hub according to the boot sequence setting values when the basic input/output system is woken up according to the boot signal.

2. The system of claim 1, wherein the embedded controller is coupled to the Universal Serial Bus port through a General Purpose I/O pin.

3. The system of claim 2, wherein the embedded controller generates the boot signal according to logic voltage variation of the General Purpose I/O pin.

4. The system of claim 3, wherein the logic voltage variation is variation from a logic-low voltage to a logic-high voltage, and the logic-high voltage is higher than a first predetermined value.

5. The system of claim 3, wherein the logic voltage variation is variation from a logic-low voltage to a logic-high voltage, and the logic-high voltage is higher than a first predetermined value for a first predetermined period.

6. The system of claim 3, wherein the logic voltage variation is variation from a logic-high voltage to a logic-low voltage, and the logic-low voltage is lower than a second predetermined value.

7. The system of claim 3, wherein the logic voltage variation is variation from a logic-high voltage to a logic-low voltage, and the logic-low voltage is lower than a second predetermined value for a second predetermined period.

8. The system of claim 1, wherein the embedded controller is coupled to the Universal Serial Bus port through a logic circuit.

9. The system of claim 8, wherein the logic circuit comprises:
   an AND gate having a first input terminal coupled to a pin of the Universal Serial Bus port, a second input terminal coupled to another pin of the Universal Serial Bus port, and an output terminal coupled to the embedded controller.

10. The system of claim 9, wherein the embedded controller generates the boot signal according to logic voltage variation of the output terminal.

11. The system of claim 10, wherein the logic voltage variation is variation from a logic-low voltage to a logic-high voltage, and the logic-high voltage is higher than a first predetermined value.

12. The system of claim 10, wherein the logic voltage variation is variation from a logic-low voltage to a logic-high voltage, and the logic-high voltage is higher than a first predetermined value for a first predetermined period.

13. The system of claim 10, wherein the logic voltage variation is variation from a logic-high voltage to a logic-low voltage, and the logic-low voltage is lower than a second predetermined value.

14. The system of claim 10, wherein the logic voltage variation is variation from a logic-high voltage to a logic-low voltage, and the logic-low voltage is lower than a second predetermined value for a second predetermined period.

15. The system of claim 1, wherein the boot sequence setting values store a code of at least one device coupled to the system.

16. A method capable of booting through a Universal Serial Bus device, the method comprising:
   an embedded controller generating a boot signal when the system is powered off and at least one Universal Serial Bus device is plugged into a Universal Serial Bus port;
   waking up a platform control hub and a basic input/output system according to the boot signal; and
   the basic input/output system first starting to boot the at least one Universal Serial Bus device through the platform control hub according to boot sequence setting values.

17. The method of claim 16, wherein the embedded controller generates the boot signal according to logic voltage variation of the General Purpose I/O pin.

18. The method of claim 17, wherein the logic voltage variation is variation from a logic-low voltage to a logic-high voltage, and the logic-high voltage is higher than a first predetermined value.

19. The method of claim 17, wherein the logic voltage variation is variation from a logic-low voltage to a logic-high voltage, and the logic-high voltage is maintained for a first predetermined period.

20. The method of claim 17, wherein the logic voltage variation is variation from a logic-high voltage to a logic-low voltage, and the logic-low voltage is lower than a second predetermined value.

21. The method of claim 17, wherein the logic voltage variation is variation from a logic-high voltage to a logic-low voltage, and the logic-low voltage is maintained for a second predetermined period.

22. The method of claim 16, wherein the embedded controller generates the boot signal according to logic voltage variation of an output terminal of a logic circuit.

23. The method of claim 22, wherein the logic voltage variation is variation from a logic-low voltage to a logic-high voltage, and the logic-high voltage is higher than a first predetermined value.

24. The method of claim 22, wherein the logic voltage variation is variation from a logic-low voltage to a logic-high voltage, and the logic-high voltage is maintained for a first predetermined period.

25. The method of claim 22, wherein the logic voltage variation is variation from a logic-high voltage to a logic-low voltage, and the logic-low voltage is lower than a second predetermined value.

26. The method of claim 22, wherein the logic voltage variation is variation from a logic-high voltage to a logic-low voltage, and the logic-low voltage is maintained for a second predetermined period.

27. The method of claim 16, wherein the boot sequence setting values store a code of at least one device coupled to the system.

28. The method of claim 16, further comprising:
   enabling an external device booting function; and
   powering off the system.

29. The method of claim 28, further comprising:
   the basic input/output system changing the boot sequence setting values according to the external device booting function.

30. The method of claim 16, further comprising:
   the basic input/output system changing the boot sequence setting values according to the boot signal.

* * * * *